United States Patent [19]
Yokoyama

[11] Patent Number: 5,492,745
[45] Date of Patent: Feb. 20, 1996

[54] MAGNETIC RECORDING MEDIUM AND METHOD FOR ITS PRODUCTION

[75] Inventor: Fumiaki Yokoyama, Yokohama, Japan

[73] Assignee: Mitsubishi Chemical Corporation, Tokyo, Japan

[21] Appl. No.: 194,636

[22] Filed: Feb. 10, 1994

Related U.S. Application Data

[63] Continuation of Ser. No. 500,994, Mar. 29, 1990, abandoned.

[30] Foreign Application Priority Data

Apr. 4, 1989 [JP] Japan ................................. 1-84945
Apr. 4, 1989 [JP] Japan ................................. 1-84947

[51] Int. Cl.$^6$ .............................. B32B 3/02; G11B 5/66; C23C 14/00
[52] U.S. Cl. ...................... 428/65.3; 428/65.4; 428/65.5; 428/65.6; 428/65.7; 428/336; 428/611; 428/627; 428/663; 428/667; 428/670; 428/694 T; 428/694 TS; 428/694 TP; 428/694 ST; 428/900; 204/192.1; 204/197.14; 204/192.15; 204/192.2
[58] Field of Search .................. 428/694 T, 900, 428/336, 611, 627, 663, 667, 680, 65.3, 65.4, 65.5, 65.6, 65.7; 204/192.1, 192.14, 192.15, 192.2

[56] References Cited

U.S. PATENT DOCUMENTS

| | | | |
|---|---|---|---|
| 4,409,281 | 10/1983 | Kitamoto et al. | 428/212 |
| 4,521,481 | 6/1985 | Nagao et al. | 428/336 |
| 4,645,690 | 2/1987 | Murakami et al. | 427/128 |
| 4,737,415 | 4/1988 | Ichijo et al. | 428/900 |
| 4,755,426 | 7/1988 | Kokai et al. | 428/694 T |
| 4,769,282 | 9/1988 | Tada et al. | 428/336 |
| 4,794,047 | 12/1988 | Funamoto | 428/408 |

FOREIGN PATENT DOCUMENTS

| | | |
|---|---|---|
| 205239 | 12/1986 | European Pat. Off. . |
| 303324 | 2/1989 | European Pat. Off. . |
| 350940 | 1/1990 | European Pat. Off. . |
| 113320 | 6/1985 | Japan . |
| 242324 | 3/1987 | Japan . |
| 62-112226 | 5/1987 | Japan . |
| 62-141628 | 6/1987 | Japan . |
| 162090 | 6/1988 | Japan . |
| 63-149848 | 6/1988 | Japan . |

OTHER PUBLICATIONS

A. J. Griest and B. L. Flur, "Properties of Manganese–Permalloy Films", Journal of Applied Physics, vol. 38, No. 3, Mar. 1, 1967, pp. 1431 to 1433.

L. F. Herte and A. Lang, Jr., "Effect of ion bombardment during deposition on magnetic film properties", J. Vac. Sci. Technol., vol. 18, No. 2, Mar. 1981, pp. 153 to 155.

N. Tani et al, "Effects of Substituted Elements into the Cr Layer on CoNiCr/Cr Sputtered Hard Disk", Degests of Intermag '89 Conference, HA–8, 1989.

S. L. Duan et al, "Effect of Sputtering conditions, Annealing and the Microstructure of Cr Underlayer on the Magnetic Properties of CoNiCr/Cr Thin Films", IEEE Trans. on Magn., vol. 25, No. 5, Sep. 1989, pp. 3884 to 3886.

Primary Examiner—L. Kilman
Attorney, Agent, or Firm—Oblon, Spivak, McClelland, Maier & Neustadt

[57] ABSTRACT

A magnetic recording medium comprising a non-magnetic substrate and a magnetic alloy layer formed on the substrate with a non-magnetic primer layer containing chromium as the main component interposed therebetween, wherein the magnetic alloy layer contains cobalt and nickel as the main components and not more than 8 atomic % of boron and has been formed by sputtering under such a condition that a negative bias voltage is applied to the non-magnetic substrate.

21 Claims, 6 Drawing Sheets

COERCIVE FORCE (Oe)

BIAS VOLTAGE APPLIED TO THE SUBSTRATE (V)

COERCIVE FORCE (Oe)

SUBSTRATE TEMP (°C)

MAGNETIC RECORDING MEDIUM AND METHOD FOR ITS PRODUCTION

This application is a continuation of application Ser. No. 07/500,994, filed on Mar. 29, 1990, now abandoned.

The present invention relates to a magnetic recording medium, particularly a magnetic recording medium useful for a magnetic recording apparatus such as a magnetic disk apparatus, a flexible disk apparatus or a magnetic tape apparatus, with its magnetic properties remarkably improved, and a method for its production.

In recent years, the application range of magnetic recording apparatus such as magnetic disk apparatus, flexible disk apparatus and magnetic tape apparatus, has been remarkably expanded, and their importance is increasing. At the same time, with respect to magnetic recording media to be used for such apparatus, a remarkable improvement in the recording density is being made.

With respect to such magnetic recording media, it is still required to further increase the recording density. For this purpose, it is required to increase the coercive force and the signal to noise ratio (SN ratio) of the magnetic recording layer.

It is generally known that there are the following relations between the properties of a magnetic recording medium and the linear recording density, the output and the SN ratio:

(Linear recording density)∝(Hc/Br.t)

(Output)∝(Br.t.Hc)

(SN ratio)∝(Hc/Br.t)

where Hc represents the coercive force, Br represents the residual magnetic flux density, and t represents the thickness of the layer. Further, symbol ∝ indicates that the property on the left side is proportional to the value on the right side.

Accordingly, in designing a magnetic recording medium having a high recording density, it is necessary to increase the coercive force Hc, while maintaining Br.t without impairing the required output.

In recent years, with a view to attaining the high recording density, thin metal layer-type magnetic recording media have been used instead of coating-type magnetic recording media wherein the magnetic layer is formed by coating a magnetic coating material comprising a magnetic powder and a binder resin.

In such thin metal layer-type magnetic recording media, the magnetic layer is formed by a method such as electroless plating, electroplating, sputtering or vapor deposition. As the composition for such a magnetic layer, a Co(cobalt)—P(phosphorus) alloy, a Co—Ni(nickel)—P alloy, a Co—Ni—Cr(chromium) alloy or a Co—Ni—Pt (platinum) alloy has been practically employed.

Recently, it has been reported that in a layer-forming method by sputtering, a high coercive force is obtainable by applying a negative bias voltage to the substrate during the formation of the magnetic layer (The 35th Lecture Meeting of Applied Physics Related Association in 1988, Reference Materials 29a-C-9 and -10, and Electrocommunication Association, Electronic Part Material Study Group, Reference Material CPM88-92). In these reports, it is stated that the application of the bias voltage is effective only for a specific composition containing Cr in at least a certain amount (Co 70 atomic % —Ni 20 atomic %—Cr 10 atomic %, and Co 86 atomic %—Cr 12 atomic %—Ta 2 atomic %).

It has also been reported that a further increase in the coercive force is observed when a magnetic layer is formed by adding vanadium to a composition of Co 70 atomic %—Ni 20 atomic %—Cr 10 atomic % and forming the magnetic layer under an application of a bias voltage (The 12th Lecture Meeting of Japanese Applied Magnetic Association in 1988, Collection of Summaries 30a-C-5).

Further, it is known, from the Japanese Unexamined Patent Publication No. 33324/1982 to form a magnetic layer by sputtering under an application of a bias voltage. This publication discloses a method for improving the vertical magnetic properties by forming a magnetic Co—Cr alloy layer under application of a bias voltage, and it is disclosed that by the application of the bias voltage, an increase in the coercive force was observed.

The present inventors have found it possible to obtain a magnetic recording medium having a high coercive force by forming the magnetic recording layer by sputtering under an application of a bias voltage to obtain a certain specific composition of the magnetic layer. The present invention has been accomplished on the basis of this discovery.

It is an object of the present invention to provide a magnetic recording medium having the magnetic properties remarkably improved, and a method for its production.

The present invention provides a magnetic recording medium comprising a non-magnetic substrate and a magnetic alloy layer formed on the substrate with a non-magnetic primer layer containing chromium as the main component interposed therebetween, wherein the magnetic alloy layer contains cobalt and nickel as the main components and not more than 8 atomic % of boron and has been formed by sputtering under such a condition that a negative bias voltage is applied to the non-magnetic substrate.

The present invention also provides a method for producing a magnetic recording medium, which comprises sequentially forming on a non-magnetic substrate a nonmagnetic primer layer containing chromium as the main component and a magnetic alloy layer by sputtering, wherein the magnetic alloy layer is formed by sputtering under such a condition that a negative bias voltage is applied to the non-magnetic substrate to form a magnetic alloy layer containing cobalt and nickel as the main components and not more than 8 atomic % of boron.

Here, the negative bias voltage means a potential relatively lower than the plasma potential.

In the accompanying drawings, FIG. 1 is a graph showing the relation between the amount of B added and the coercive force, obtained from Examples 1 to 6 and Comparative Example 1.

Figure 7:
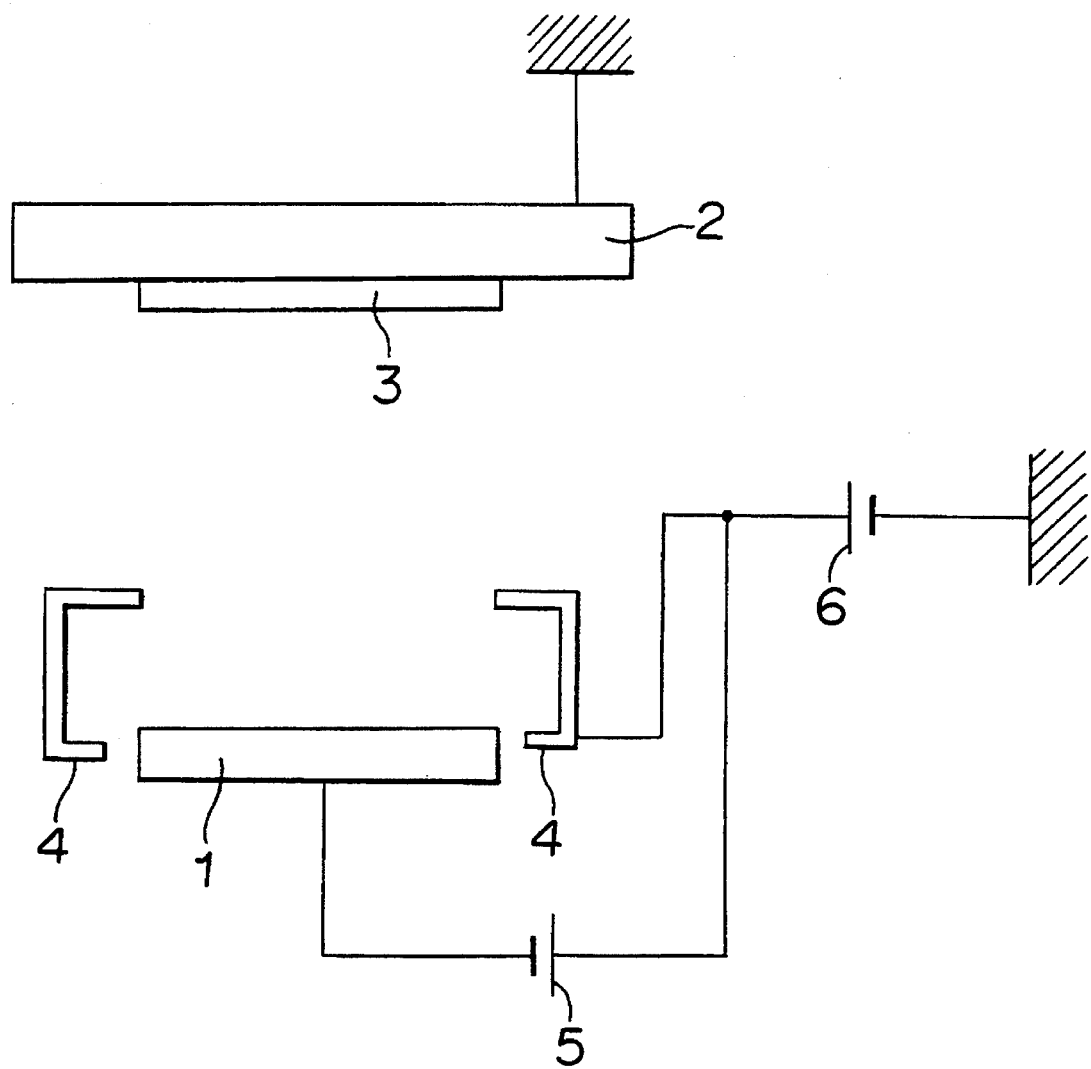

FIG. 7 is a diagrammatical illustration of a sputtering apparatus used in Example 17, in which reference numeral 1 indicates a target, numeral 2 indicates a substrate holder, numeral 3 indicates a non-magnetic substrate, numeral 4 indicates an intermediate electrode, numeral 5 indicates a power source for sputtering, and numeral 6 indicates a power source for the intermediate electrode.

Figure 8:
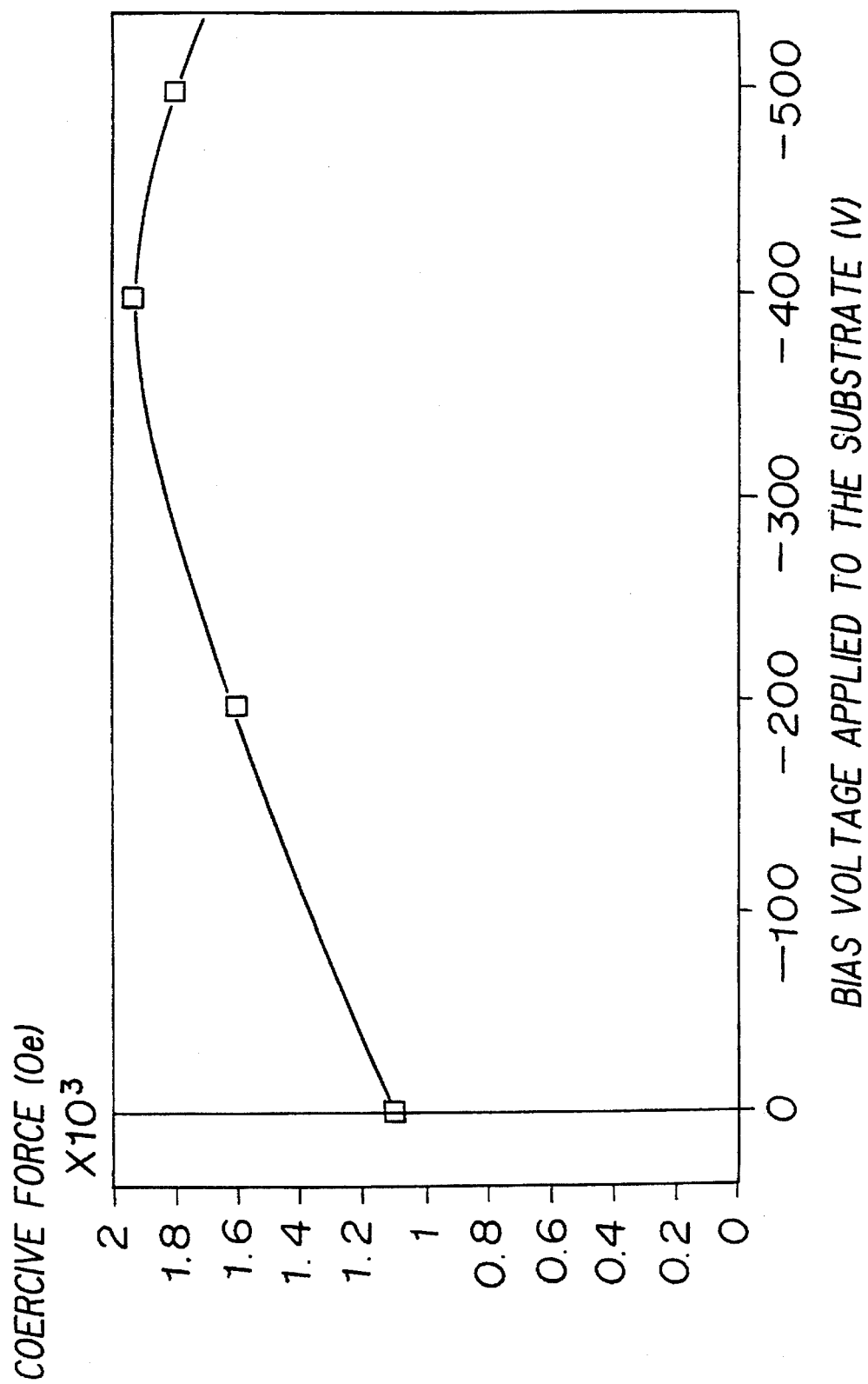

FIG. 8 is a graph showing the relation between the substrate bias voltage and the coercive force obtained in Example 17 and Comparative Example 7.

Figure 9:
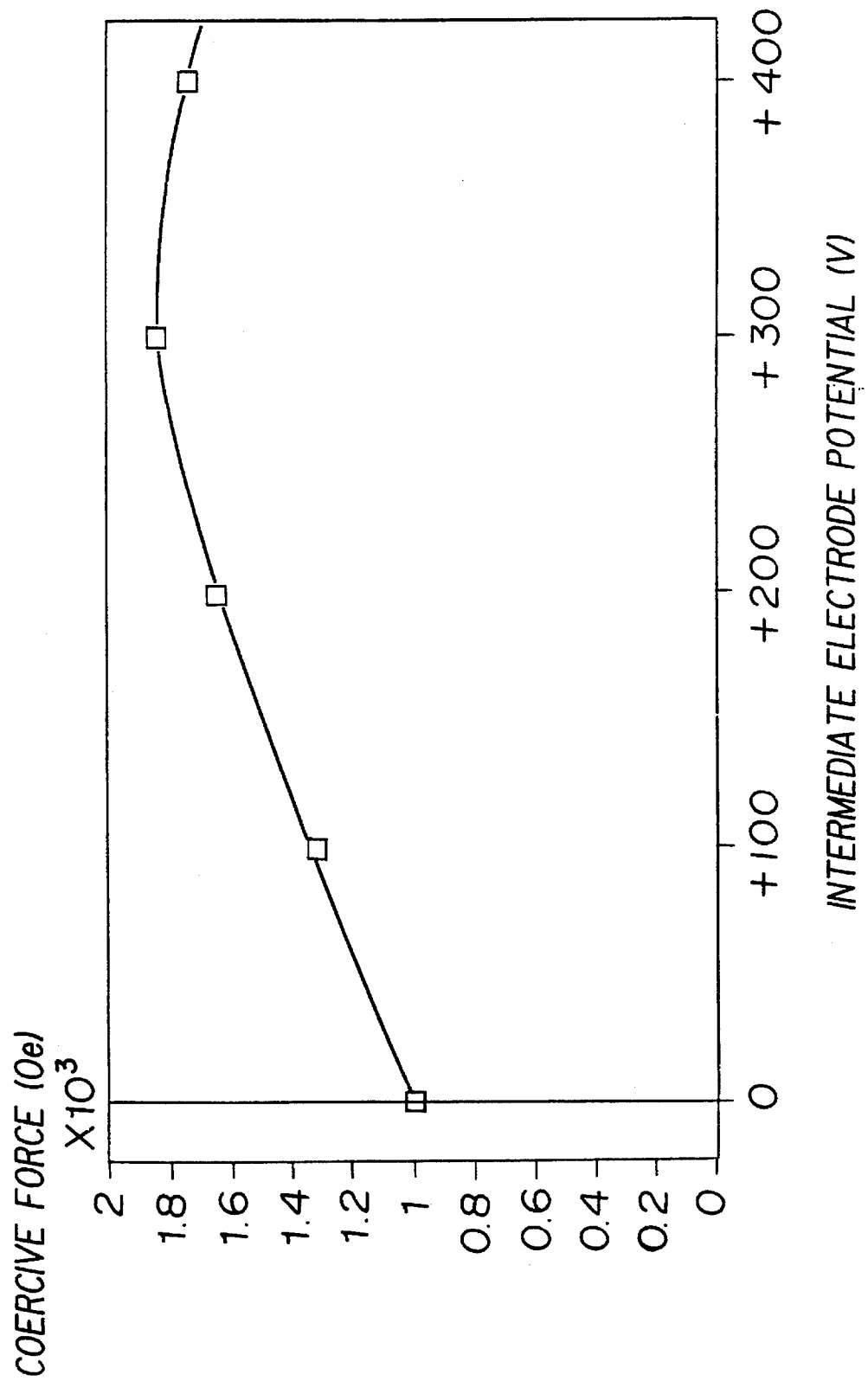

FIG. 9 is a graph showing the relation between the intermediate electrode potential and the coercive force obtained in Example 18 and Comparative Example 8.

Now, the present invention will be described in detail with reference to the preferred embodiments.

In the present invention, the non-magnetic substrate is not particularly limited. Usually, an aluminum alloy plate provided with a nickel-phosphorus layer formed by electroless plating, is used. However, it is also possible to employ other substrates such as a substrate of a metal such as copper or titanium, a glass substrate, a ceramic substrate or a resin substrate. However, in a case where the substrate is a non-conductive substrate, a certain adjustment is required, for example, AC current is adopted for the bias voltage application system for the formation of the magnetic layer, or an apparatus is adjusted to increase the plasma potential during sputtering while maintaining the substrate at a level of the ground potential.

The non-magnetic primer layer containing Cr as the main component (hereinafter sometimes referred to as a "Cr-type primer layer") formed on such a non-magnetic substrate, usually has a thickness of at least 100 Å, preferably at least 300 Å. The upper limit of the thickness is not particularly limited. However, the thickness is preferably practically not higher than 3000 Å from the viewpoint of the productivity and the magnetic properties other than the coercive force, such as squareness.

When a magnetic layer is formed by usual sputtering without applying a negative bias voltage to the substrate, the thickness of the Cr-type primer layer is required to be at a level of from 1500 to 3000 Å in order to increase the coercive force of the magnetic layer. Whereas, the thickness of the Cr-type primer layer may be thin so long as it is sufficient for the in-plane orientation of the axis of easy magnetization of the magnetic layer, and even with a thin primer layer, a high coercive force can easily be obtained.

The Cr-type primer layer may be any layer so long as it contains Cr as the main component. Namely, so long as the crystallinity of Cr is not impaired, it may contain elements other than Cr, such as aluminum, copper, silicon etc. in a few %.

There is no particular restriction as to the sputtering conditions for forming the Cr-type primer layer. It is possible to employ sputtering conditions which are commonly employed for the formation of a usual Cr-type primer layer. At that time, a negative bias voltage may or may not be applied to the substrate. When it is applied, the magnetic properties will be improved to some extent.

In the present invention, the magnetic alloy layer to be formed on such a Cr-type primer layer, is a Co—Ni—B type magnetic layer which contains Co and Ni as the main components and not more than 8 atomic %, preferably from 0.005 to 8.0 atomic %, more preferably from 2 to 5 atomic %, of B. If the content of B exceeds 8 atomic %, no adequate effects for increasing the coercive force will be obtained.

Further, the coercive force tends to increase as the content of Ni increases. Ni may be contained at a level of about 40 atomic % at the maximum relative to Co. However, it is preferably contained in an amount of from 15 to 35 atomic % relative to Co. More preferably, it is contained in an amount of from 20 to 35 atomic % relative to Co.

Further, in the present invention, it is possible to employ a Co—Ni—Cr—B type alloy magnetic layer, which is obtained by incorporating Cr to the Co—Ni—B type magnetic layer.

In this case, the content of Cr is usually within a range of from 5 to 26 atomic %, preferably from 6 to 18 atomic %, more preferably from 8 to 14 atomic %. If the Cr content exceeds 26 atomic %, the saturation magnetic flux density tends to be small and impractical. On the other hand, if it is less than 5 atomic %, the effects for increasing the coercive force will be small.

Further, when sputtering for the formation of the magnetic layer is conducted in an argon atmosphere, argon is unavoidably included in the magnetic layer by the bias effects which will be described hereinafter. The amount of argon is at a level of from about 0.2 to 1.5 atomic %, which is larger than the case of a usual sputtering layer-forming operation wherein a negative bias voltage is not applied to the substrate.

The thickness of the magnetic layer may suitably be determined depending upon the properties required for the magnetic recording medium. Usually, it is preferably from 300 to 1500 Å.

The method for producing a magnetic recording medium of the present invention is Characterized in that the above-mentioned Co—Ni—B type alloy magnetic layer is formed by sputtering under such a condition that a negative bias voltage is applied to the non-magnetic substrate i.e. in such a state that a voltage relatively lower than the plasma potential is applied to the non-magnetic substrates.

To apply a voltage relatively lower than the plasma potential to the non-magnetic substrate, it is possible to employ a method wherein a negative voltage is applied to the non-magnetic substrate relative to the grounded portion of the main body of the sputtering apparatus (hereinafter referred to also as a substrate bias method), or a method wherein the plasma potential is adjusted to be higher than the ground potential while maintaining the non-magnetic substrate at a level of the ground potential.

Figure 2:
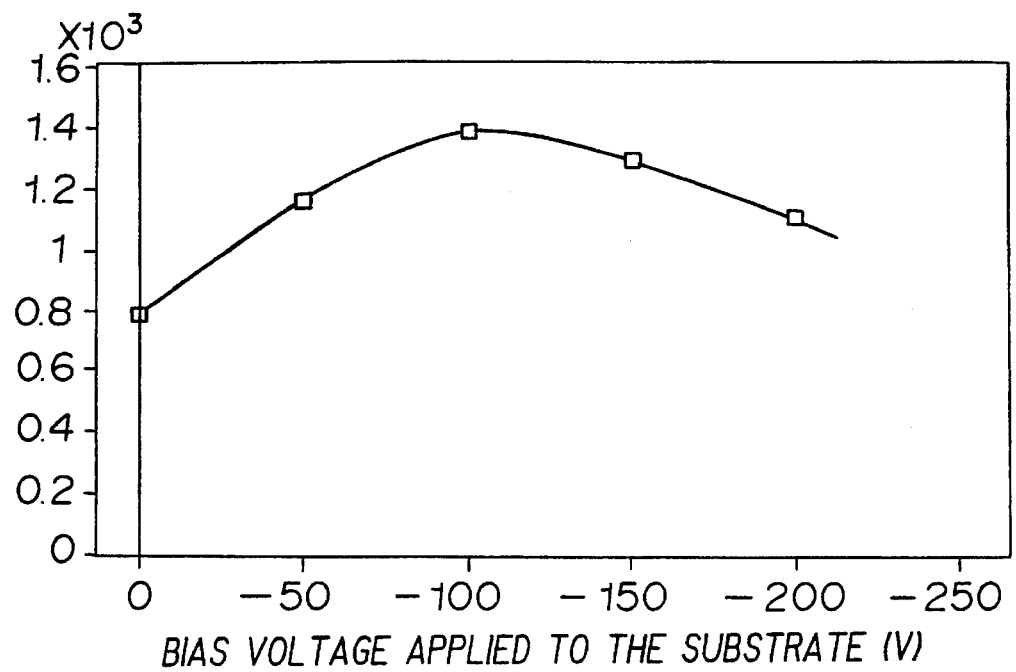
FIG. 2 is a graph showing the relation between the substrate bias voltage and the coercive force obtained from Example 7 and Comparative Example 2.

In the present invention, the coercive force of the magnetic recording medium obtained, is remarkably influenced by the negative bias voltage applied to the substrate during the formation of the magnetic layer by sputtering. Namely, as shown in FIG. 2, in the Examples given hereinafter, a high coercive force of at least 1000 oersted (Oe) is obtainable when the negative substrate bias voltage exceeds −40 V. However, if the negative bias voltage applied to the non-magnetic substrate is too much, the formed magnetic layer is subjected to re-sputtering, and the magnetic properties tend to be poor.

Accordingly, when the above-mentioned substrate bias method is employed, as to a high frequency magnetron sputtering method, the negative substrate bias voltage is preferably within a range of from about −40 to −200 V for forming the above-mentioned Co—Ni—B type alloy magnetic layer, or within a range of from about −40 to −250 V for forming the above Co—Ni—Cr—B type alloy magnetic layer, and as to a direct current magnetron sputtering method, the negative substrate bias voltage is preferably within a range of from about −50 to −500 V.

Whereas in the case of the method wherein the plasma potential is set at a level higher than the ground potential while maintaining the non-magnetic substrate at a level of the ground potential, it is preferred that an intermediate electrode is provided in the vicinity of the target, and a positive voltage of e.g. not higher than 1000 V, preferably from 50 to 500 V, is applied to the intermediate electrode relative to the grounded portions of the non-magnetic substrate and the main body of the sputtering apparatus.

The effects of the application of the plasma potential and the bias potential during the layer-forming operation by sputtering, are affected by the geometrical influences such as the dimension and the shape of the sputtering apparatus. Therefore, the above-mentioned values of the negative substrate bias voltage and the values of the positive voltage applied to the intermediate electrode, are not absolute values, and the optimum ranges thereof vary depending upon the particular apparatus.

Figure 3:
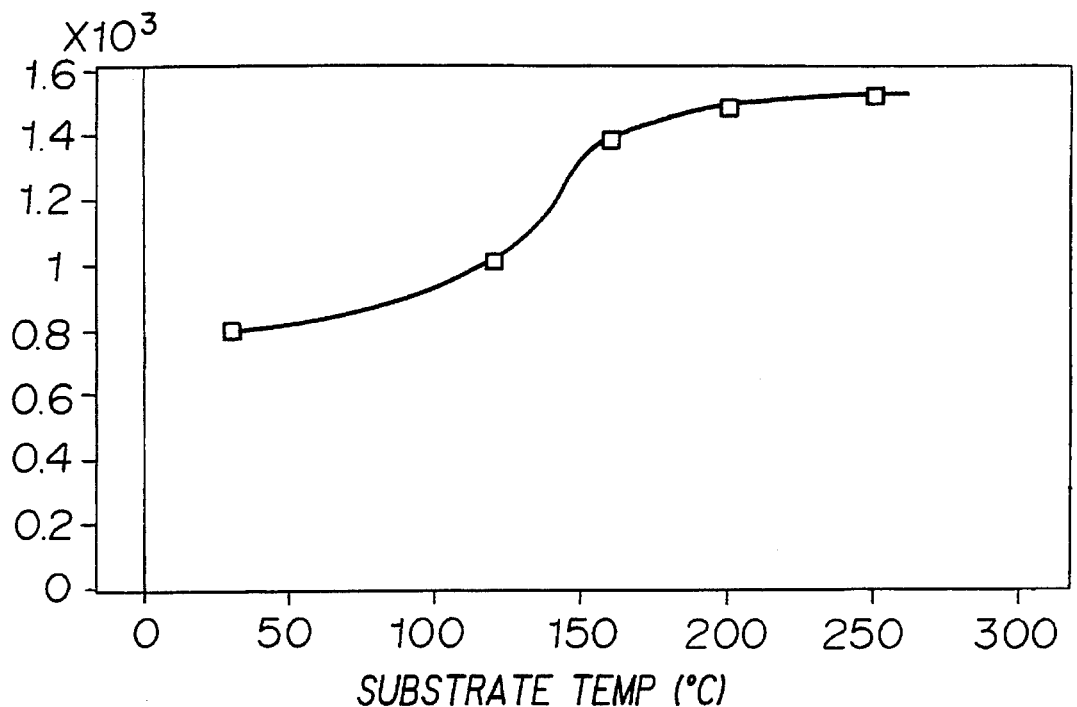
FIG. 3 is a graph showing the relation between the substrate temperature during the layer-forming operation and the coercive force obtained from Example 8 and Comparative Example 3.

The coercive force of the magnetic recording medium obtained, is remarkably influenced by the temperature of the non-magnetic substrate during the sputtering operation. Namely, as shown in FIG. 3, in the following Examples, a remarkable increase of the coercive force is observed when the substrate temperature becomes to be at least 120° C., and it is possible to obtain a high coercive force exceeding 1000 Oe. Accordingly, the substrate temperature during the layer-forming operation, is preferably at least 120° C., more preferably at least 150° C. The upper limit for the substrate temperature during the layer-forming operation, can not simply be defined. However, for example, in the case of an aluminum alloy substrate provided with a nickel-phosphorus plating by electroless plating, the substrate temperature is usually preferably at most 300° C. to maintain the surface smoothness and to prevent the magnetization of the nickel-phosphorus plating. The pressure during the sputtering operation is preferably as low as possible, since the mean free path for atoms or ions thereby increases. However, under a highly vacuumed condition exceeding $1\times10^{-3}$m Torr, it is difficult to maintain a stabilized plasma state by a usual sputtering apparatus. Therefore, the practical pressure range is preferably from $1\times10^{-3}$ to $20\times10^{-3}$m Torr.

The sputtering method may be a direct current magnetron sputtering method or a high frequency magnetron sputtering method. When the substrate is a nonconductive substrate, a high frequency magnetron sputtering method is preferred.

In the magnetic recording medium of the present invention, a protective layer such as carbon and/or a lubricant layer composed of a suitable lubricant may further be formed on the magnetic layer, as the case requires.

With a magnetic layer having a composition of Co 80 atomic %—Ni 20 atomic %, the coercive force is at a level of from 700 to 800 Oe, and with a magnetic layer composed solely of Co, or Co and Ni, no increase in the coercive force is observed even when the magnetic layer is formed by sputtering under such a condition that a negative bias voltage is applied to the substrate.

The coercive force is substantially increased by forming a magnetic layer containing Co and Ni as the main components and the predetermined amount of B, by sputtering under such a condition that a negative bias voltage is applied to the substrate.

Now, the present invention will be described in further detail with reference to Examples and Comparative Examples. However, it should be understood that the present invention is by no means restricted by such specific Examples.

EXAMPLES 1 to 6 and COMPARATIVE EXAMPLE 1

A non-magnetic Ni—P layer was formed by electroless plating in a thickness of 25 μm on the surface of an aluminum alloy disk substrate having an inner diameter of 25 mm and an outer diameter of 95 mm, and the surface was polished for specular finish to obtain Ra (central line average roughness) of from 20 to 30 Å. This non-magnetic substrate was mounted in a high frequency (13.56 MHz) magnetron sputtering apparatus, and the apparatus was evacuated to $1\times10^{-6}$ Torr. Then, the substrate temperature was raised to 160° C., and a Cr primer layer was formed in a thickness of about 1400 Å while applying a direct current bias voltage of −100 V to the substrate.

Then, by using various targets having different number of B chips mounted on targets having a composition of Co 80 atomic %—Ni 20 atomic %, sputtering was conducted while applying a direct current bias voltage of −100 V to form various magnetic layers in such a thickness as to bring the saturation magnetization quantity of each magnetic layer to a level of $4.7\times10^{-3}$ emu/cm$^2$, to obtain magnetic recording media.

Figure 1:
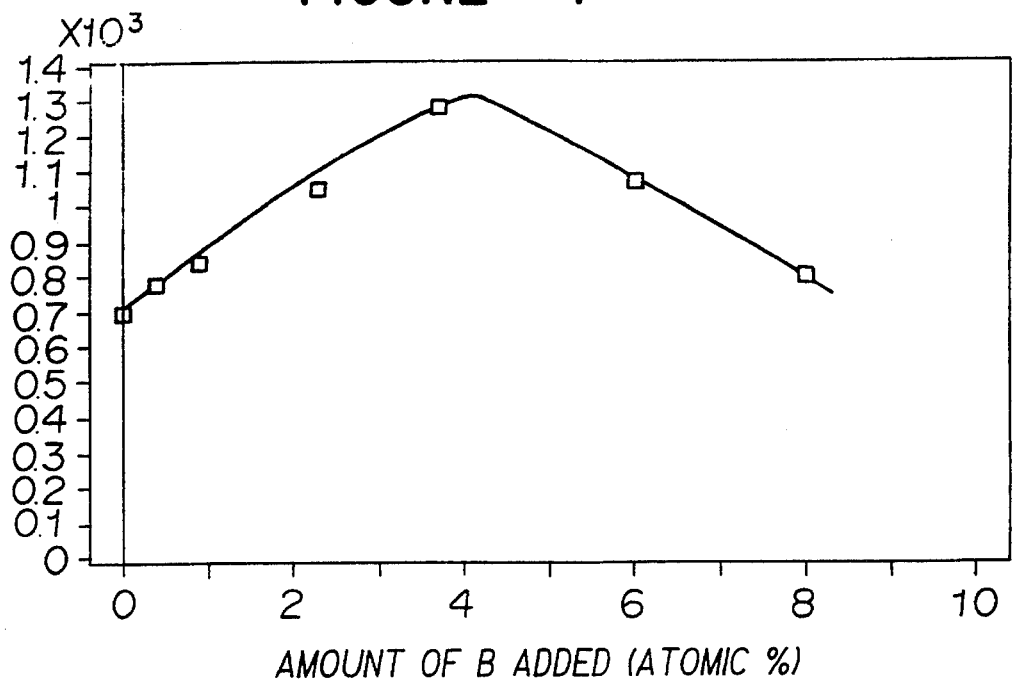

The coercive forces Hc of the magnetic recording media thus obtained were measured, and the results are shown together with the compositions of the magnetic layers in Table 1 and in FIG. 1.

The measurement of the coercive forces Hc was conducted by means of a sample vibrating type magnetometer, and the analysis of the compositions of the magnetic layers was conducted by a chemical analysis.

TABLE 1

| | Composition of magnetic layer (atomic %) | | | Coercive force (Oe) |
|---|---|---|---|---|
| | Co | Ni | B | |
| Example 1 | 79.7 | 19.9 | 0.4 | 780 |
| Example 2 | 79.2 | 19.8 | 1.0 | 840 |
| Example 3 | 78.2 | 19.5 | 2.3 | 1050 |
| Example 4 | 77.0 | 19.3 | 3.7 | 1280 |
| Example 5 | 75.2 | 18.8 | 6.0 | 1070 |
| Example 6 | 73.6 | 18.4 | 8.0 | 800 |
| Comparative Example 1 | 80.0 | 20.0 | — | 700 |

From Table 1 and FIG. 1, it is evident that by the addition of B, the coercive force is remarkably improved, and there is an optimum range for the content of B.

EXAMPLE 7 and COMPARATIVE EXAMPLE 2

Magnetic recording media were prepared in the same manner as in Example 1 except that Ni and B chips were mounted on a target having a composition of Co 80 atomic %—Ni 20 atomic % to adjust the composition of the magnetic layers to Co 66.1 atomic %—Ni 31.6 atomic %—B 2.3 atomic %, and the direct bias voltage of the non-magnetic substrate was adjusted to the voltage shown in Table 2. The coercive forces of the respective media were measured, and the results are shown in Table 2 and in FIG. 2. Further, a case where no bias voltage was applied to the substrate is shown as Comparative Example 2.

TABLE 2

| | Substrate bias voltage (V) | Coercive force (Oe) |
|---|---|---|
| Example 7 | −50 | 1150 |
| | −100 | 1380 |
| | −150 | 1290 |
| | −200 | 1100 |
| Comparative Example 2 | — | 780 |

From Table 2 and FIG. 2, it is evident that by the application of a negative bias voltage, the coercive force is remarkably improved, and there is an optimum range.

EXAMPLE 8

Magnetic recording media having magnetic layers having a composition of Co 66.1 atomic %—Ni 31.6 atomic %—B 2.3 atomic %, were produced in the same manner as in Example 1 except that the substrate temperature during the formation of the magnetic layers was changed to the temperature shown in Table 3. The coercive forces of the respective magnetic recording media were measured, and the results are shown in Table 3 and in FIG. 3.

Here, the substrate temperature during the formation of each layer is represented by the substrate temperature immediately prior to the formation of the layer.

TABLE 3

| Substrate temp. (°C.) | Coercive force (Oe) |
| --- | --- |
| 30 | 800 |
| 120 | 1010 |
| 160 | 1380 |
| 200 | 1480 |
| 250 | 1520 |

EXAMPLE 9

A magnetic recording medium was produced in the same manner as in Example 1 except that Ni and B chips were mounted on a target having a composition of Co 80 atomic %—Ni 20 atomic % to adjust the composition of the magnetic layer to Co 66.1 atomic %—Ni 31.6 atomic %—B 2.3 atomic %, and a bias voltage of −100 V was applied to the substrate only during the formation of the magnetic layer. The coercive force was measured and found to be 1330 Oe.

This value is slightly smaller than the case where the substrate bias voltage was applied also at the time of forming the Cr primer layer.

EXAMPLES 10 to 13 and COMPARATIVE EXAMPLE 3

A non-magnetic Ni—P layer was formed by electroless plating in a thickness of 25 μm on the surface of an aluminum alloy disk substrate having an inner diameter of 25 mm and an outer diameter of 95 mm, and the surface was polished for specular finish to obtain Ra (central-line average roughness) of from 20 to 30 Å. This non-magnetic substrate was mounted in a high frequency (13.56 MHz) magnetron sputtering apparatus, and the apparatus was evacuated to $1 \times 10^{-6}$ Torr. Then, the substrate temperature was raised to 160° C., and a Cr primer layer was formed in a thickness of about 1400 Å while applying a direct current bias voltage of −100 V to the substrate.

Then, by using various targets having different number of B chips mounted on targets having a composition of Co 80 atomic %—Cr 8 atomic %—Ni 20 atomic %, sputtering was conducted while applying a direct current bias voltage of −100 V to form various magnetic layers in such a thickness as to bring the saturation magnetization quantity of each magnetic layer to a level of $4.7 \times 10^{-3}$ emu/cm$^2$, to obtain magnetic recording media.

Figure 4:
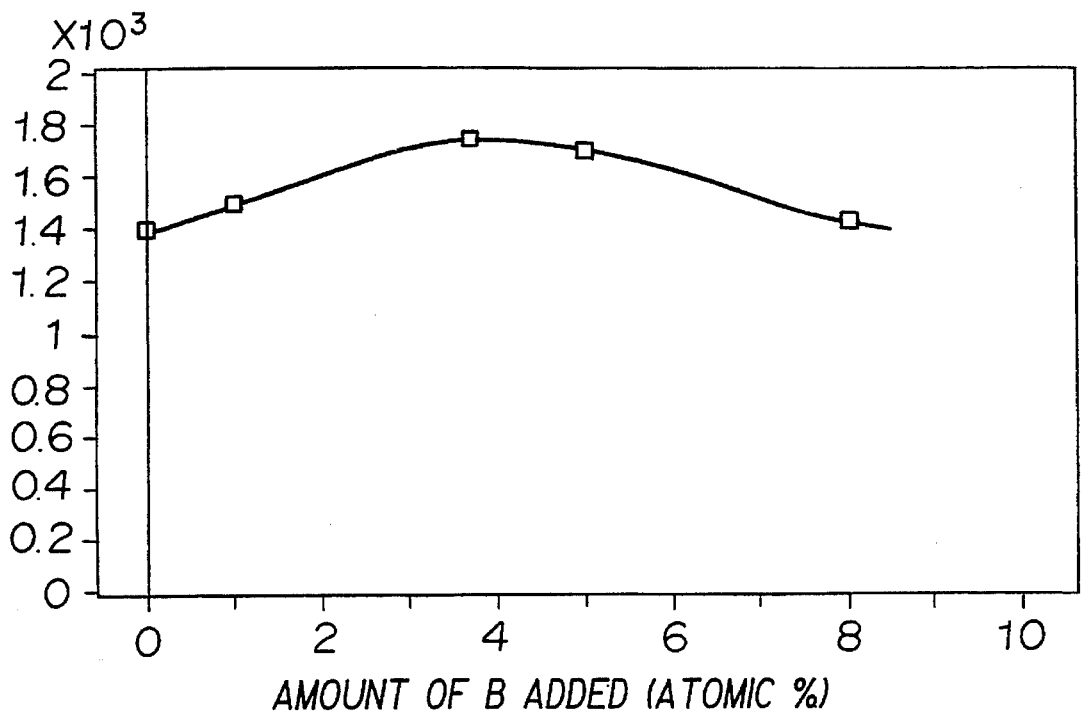
FIG. 4 is a graph showing the relation between the amount of B added and the coercive force obtained from Examples 10 to 13 and Comparative Example 3.

The coercive forces Hc of the magnetic recording media thus obtained were measured, and the results are shown together with the composition of the magnetic layers in Table 4 and in FIG. 4.

The measurement of the coercive forces Hc was conducted by means of a sample vibrating type magnetometer, and the analysis of the compositions of the magnetic layers was conducted by a chemical analysis.

TABLE 4

| | Composition of magnetic layer (atomic %) | | | | Coercive force (Oe) |
| --- | --- | --- | --- | --- | --- |
| | Co | Ni | Cr | B | |
| Example 10 | 73.4 | 17.7 | 7.9 | 1.0 | 1500 |
| Example 11 | 71.3 | 17.3 | 7.7 | 3.7 | 1740 |
| Example 12 | 70.3 | 17.1 | 7.6 | 5.0 | 1700 |
| Example 13 | 68.0 | 16.6 | 7.4 | 8.0 | 1430 |
| Comparative Example 3 | 74.0 | 18.0 | 8.0 | — | 1400 |

From Table 4 and FIG. 4, it is evident that by the addition of B, the coercive force is remarkably improved, and there is an optimum range for the content of B.

EXAMPLE 14 and COMPARATIVE EXAMPLE 4

The magnetic layer was formed in the same manner as in Example 10 except that the composition of the magnetic layer was adjusted to Co 71.3 atomic %—Ni 17.3 atomic %—Cr 7.7 atomic %—B 3.7 atomic %, and the direct current bias voltage applied to the non-magnetic substrate was changed to the voltage as identified in Table 5. The coercive force of each magnetic medium was measured, and the results are shown in Table 5 and in FIG. 5.

TABLE 5

| | Substrate bias voltage (V) | Coercive force (Oe) |
| --- | --- | --- |
| Example 14 | −50 | 1400 |
| | −100 | 1740 |
| | −150 | 1660 |
| | −200 | 1500 |
| | −250 | 1200 |
| Comparative Example 4 | — | 1050 |

Figure 5:
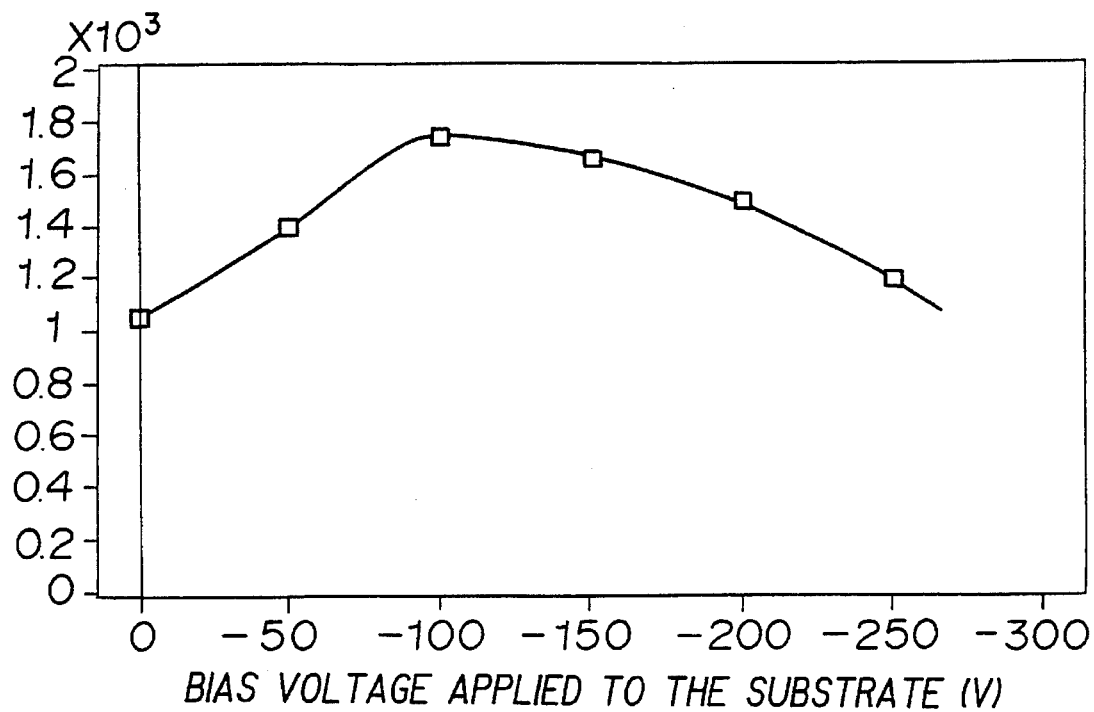
FIG. 5 is a graph showing the relation between the substrate bias voltage and the coercive force obtained from Example 14 and Comparative Example 4.

From Table 5 and FIG. 5, it is evident that by an application of a negative substrate bias voltage, the coercive force can remarkably be improved, and there is an optimum range.

EXAMPLE 15

Figure 6:
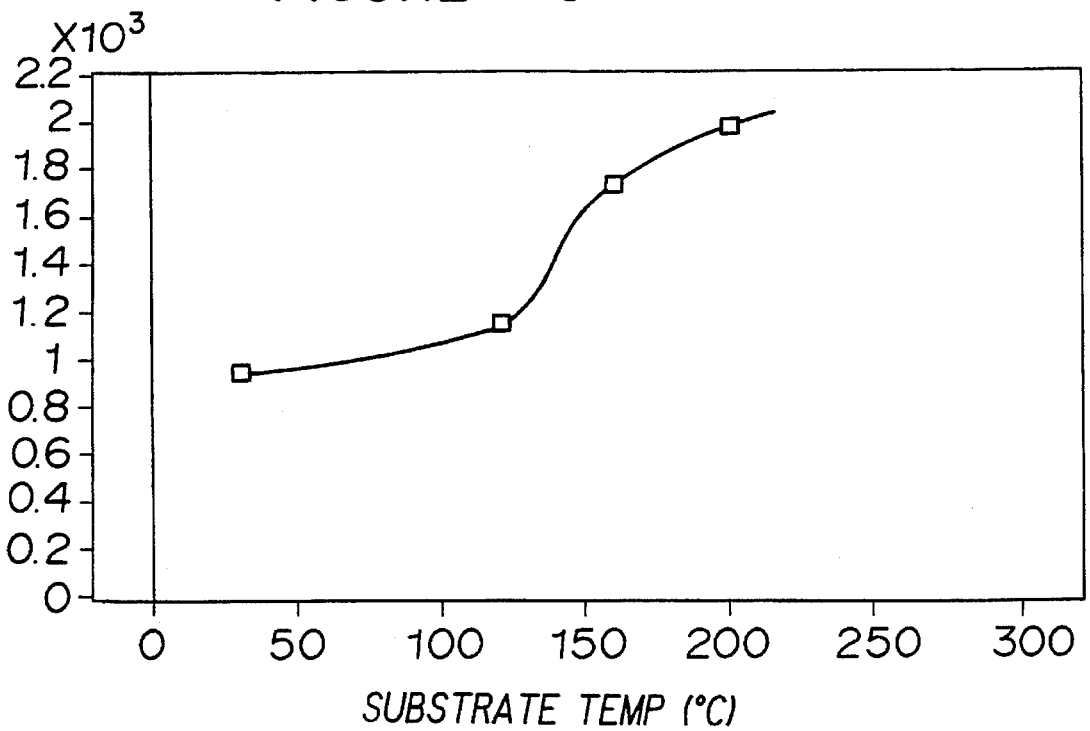
FIG. 6 is a graph showing the relation between the substrate temperature during the layer-forming operation and the coercive force obtained in Example 15.

A magnetic recording medium having a magnetic layer with a composition of Co 71.3 atomic %—Ni 17.3 atomic %—Cr 7.7 atomic %—B 3.7 atomic % was produced in the same manner as in Example 10 except that the substrate temperature during the formation of the magnetic layer was adjusted to the temperature identified in Table 6. The coercive force of each magnetic recording medium was measured, and the results are shown in Table 6 and in FIG. 6.

Here, the substrate temperature during the formation of the layer is represented by the substrate temperature immediately prior to the formation of the layer.

TABLE 6

| Substrate temp. (°C.) | Coercive force (Oe) |
| --- | --- |
| 30 | 940 |
| 120 | 1150 |
| 160 | 1740 |
| 200 | 1980 |

EXAMPLE 16

A magnetic recording medium was produced in the same manner as in Example 10 except that the composition of the magnetic layer was adjusted to Co 71.3 atomic %—Ni 17.3 atomic %—Cr 7.7 atomic %—B 3.7 atomic %, and the substrate bias voltage of −100 V was applied only during the formation of the magnetic layer.

The coercive force was measured and found to be 1630 Oe. This value is slightly lower than the case where the substrate bias voltage was applied also during the formation of Cr primer layer.

COMPARATIVE EXAMPLES 5 and 6

A magnetic recording medium was produced in the same manner as in Example 10 except that a target having a various number of B chips mounted on an alloy target for the magnetic layer having a composition of Co 84 atomic %—Cr 16 atomic %, was used. The coercive force was measured, and the results are shown in Table 7 together with the composition of the magnetic layer.

TABLE 7

| | Composition of magnetic layer (atomic %) | | | Coercive force (Oe) |
| --- | --- | --- | --- | --- |
| | Co | Cr | B | |
| Comparative Example 5 | 82.9 | 15.8 | 1.3 | 1080 |
| Comparative Example 6 | 84.0 | 16.0 | — | 1460 |

As is evident from Table 7, when B is added to a Co—Cr type magnetic layer, a decrease of the coercive force is observed.

As described in detail in the foregoing, the magnetic recording medium of the present invention is the one wherein a magnetic alloy layer having a specific composition is formed on a non-magnetic substrate with a Cr-type primer layer interposed therebetween. A remarkably high coercive force is obtained by applying a negative bias voltage to the non-magnetic substrate when the magnetic layer is formed by sputtering. Accordingly, it is possible to provide a magnetic recording medium useful for high density recording.

EXAMPLE 17 and COMPARATIVE EXAMPLE 7

The magnetic layer was formed in the same manner as in Example 14 except that the composition of the magnetic layer was adjusted to Co 61 atomic %—Ni 29 atomic %—Cr 7 atomic %—B 3 atomic %, a DC magnetron sputtering apparatus was used as the sputtering apparatus, the non-magnetic substrate was heated to 210° C., and the direct current substrate bias voltage was changed to a level as identified in Table 8. The coercive force of each magnetic medium was measured, and the results are shown in Table 8 and FIG. 8.

TABLE 8

| | Substrate bias voltage (V) | Coercive force (Oe) |
| --- | --- | --- |
| Example 17 | −200 | 1600 |
| | −400 | 1940 |
| | −500 | 1800 |
| Comparative Example 7 | — | 1100 |

From Table 8 and FIG. 8, it is evident that by an application of a negative substrate bias voltage, the coercive force can remarkably be improved, and there is an optimum range.

EXAMPLE 18 and COMPARATIVE EXAMPLE 8

In Example 17, the magnetic layer was formed by using a sputtering apparatus as shown in FIG. 7, wherein reference numeral 1 indicates a target, numeral 2 indicates a substrate holder, numeral 3 indicates a substrate, numeral 4 indicates an intermediate electrode, numeral 5 indicates a power source for sputtering, and numeral 6 indicates a power source for the intermediate electrode. During the layer forming, a positive direct current voltage as identified in Table 9 was applied. The coercive force of each magnetic medium was measured, and the results are shown in Table 9 and FIG. 9.

TABLE 9

| | Intermediate electrode voltage (V) | Coercive force (Oe) |
| --- | --- | --- |
| Example 18 | +100 | 1320 |
| | +200 | 1650 |
| | +300 | 1850 |
| | +400 | 1750 |
| Comparative Example 8 | — | 1000 |

EXAMPLE 19

The magnetic layer was formed in the same manner as in Example 18 except that the composition of the magnetic layer was adjusted to Co 67 atomic %—Ni 30 atomic %—B 3 atomic %. During the layer forming, a current voltage of +300 V was applied to the intermediate electrode. The coercive force was 1380 Oe.

I claim:

1. A magnetic disk recording medium, comprising:

a non-magnetic disk substrate;

a non-magnetic primer layer thereon containing chromium, and a magnetic alloy layer thereon consisting of cobalt, not more than 27 atomic % of nickel, from 5 to 26 atomic % of chromium and from 1 to 7 atomic % of boron, formed by sputtering under such a condition that a negative bias voltage is applied to the non-magnetic substrate relative to the grounded portion of the main body of the sputtering apparatus, wherein said magnetic disk recording medium has a coercive force of at least 1500 Oe.

2. The magnetic recording medium according to claim 1, wherein the non-magnetic substrate is an aluminum alloy sheet provided with a nickel-phosphorus layer.

3. The magnetic recording medium according to claim 1, wherein the non-magnetic substrate is selected from the group consisting of a metal substrate, a glass substrate, a ceramic substrate and a resin substrate.

4. The magnetic recording medium according to claim 1, wherein the non-magnetic primer layer containing chromium as the main component has been formed by sputtering under such a condition that a negative bias voltage is applied to the non-magnetic substrate.

5. The magnetic recording medium according to claim 1, wherein the thickness of the magnetic alloy layer is within a range of from 300 to 1500 Å.

6. The magnetic recording medium according to claim 14, wherein the magnetic alloy layer has been formed by sputtering under such a condition that a negative bias voltage of from −40 to −250 V is applied to the non-magnetic substrate relative to the grounded portion of the main body of a high frequency magnetron sputtering apparatus.

7. The magnetic recording medium according to claim 1, wherein the magnetic alloy layer has been formed by sputtering under such a condition that a negative bias voltage of from −50 to −500 V is applied to non-magnetic substrate relative to the grounded portion of the main body of a direct current magnetron sputtering apparatus.

8. The magnetic recording medium according to claim 1, wherein the magnetic alloy layer has been formed by sputtering under such a condition that the non-magnetic substrate is maintained at a level of the ground potential and the plasma potential is set at a level higher than the ground potential.

9. The magnetic recording medium according to claim 1, wherein the temperature of the non-magnetic substrate during the formation of the magnetic alloy layer is at least 120° C.

10. The magnetic recording medium according to claim 1, wherein a protective layer is formed on the magnetic alloy layer.

11. The magnetic disk recording medium of claim 1, wherein the atomic ratio of cobalt to nickel in said magnetic alloy layer is not more than 1:0.4.

12. The magnetic recording medium of claim 1, wherein said chromium in said magnetic alloy layer is present in an amount from 6 to 18 atomic %.

13. The magnetic recording medium of claim 1, wherein said non-magnetic primer layer consists essentially of chromium.

14. The magnetic recording medium of claim 1, wherein said boron in said magnetic alloy layer is present in an amount of from 2 to 5 atomic %.

15. The magnetic recording medium according to claim 8, wherein the magnetic alloy layer has been formed by sputtering under such a condition that an intermediate electrode is provided in the vicinity of the target, and a positive voltage is applied to the intermediate electrode relative to the grounded portion of the non-magnetic substrate.

16. The magnetic recording medium according to claim 9, wherein the temperature of the non-magnetic substrate during the formation of the magnetic alloy layer is within a range of from 120° to 300° C.

17. The magnetic recording medium according to claim 10, wherein a lubricant layer is formed on the protective layer.

18. The magnetic disk recording medium of claim 11, wherein said atomic ratio of cobalt to nickel is from 1:0.15 to 1:0.35.

19. The magnetic disk recording medium of claim 12, wherein said chromium in said magnetic alloy layer is present in an amount from 8 to 14 atomic %.

20. The magnetic recording medium according to claim 15, wherein a positive voltage of from 50 to 500 V is applied to the intermediate electrode relative to the grounded portion of the non-magnetic substrate.

21. The magnetic disk recording medium of claim 18, wherein said atomic ratio of cobalt to nickel is from 1:0.2 to 1:0.35.

* * * * *